US006769011B1

(12) United States Patent
Desrochers et al.

(10) Patent No.: US 6,769,011 B1
(45) Date of Patent: Jul. 27, 2004

(54) METHOD AND SYSTEM FOR SCALABLE EVENT NOTIFICATION IN LIGHTWEIGHT DIRECTORY ACCESS PROTOCOL SYSTEMS

(75) Inventors: Stephane Desrochers, Blainville (CA); Nicolas Gosselin, Blainville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 756 days.

(21) Appl. No.: 09/709,122

(22) Filed: Nov. 8, 2000

(51) Int. Cl.[7] .................................................. G06F 15/16
(52) U.S. Cl. ........................ 709/203; 709/202; 709/246
(58) Field of Search ................................ 709/246, 202, 709/203, 225, 229; 707/1, 2, 10

(56) References Cited

U.S. PATENT DOCUMENTS

| 6,085,188 | A  | * | 7/2000  | Bachmann et al. ............. 707/3   |
| 6,321,259 | B1 | * | 11/2001 | Ouellette et al. ............ 709/220 |
| 6,408,306 | B1 | * | 6/2002  | Byrne et al. ............. 707/104.1  |
| 6,507,849 | B1 | * | 1/2003  | Choudhary ............. 707/103 Y     |
| 6,629,132 | B1 | * | 9/2003  | Ganguly et al. ............ 709/213   |
| 6,654,891 | B1 | * | 11/2003 | Borsato et al. ............. 713/201  |

FOREIGN PATENT DOCUMENTS

EP        0955761 A1      2/1999

OTHER PUBLICATIONS

R. Weltman, "Java LDAP Controls", *Netscape Communications Corp., IETF draft*, Aug. 12, 1999.

M. Wahl, "Lightweight Directory Access Protocol (v3)", *RFC2251*, Dec. 1997.

* cited by examiner

*Primary Examiner*—Mehmet Geckil
(74) *Attorney, Agent, or Firm*—Jenkens & Gilchrist

(57) ABSTRACT

A directory-search system for an LDAP server is provided to permit faster and more efficient persistent searches of LDAP directories of the server. Directory searches are performed by a proxy interoperably connected to one or more LDAP directories of the server and to one or more clients of the LDAP directories. The proxy searches a portion of the LDAP directories and receives registrations from one or more of the clients. The proxy can combine registrations from multiple clients into a single search of the LDAP directory. Registrations by the clients can be restricted to the portion of the LDAP directories searched by the proxy. The LDAP directories respond to the searches by the proxy by notifying the proxy concerning modifications to entries in the LDAP directories. In response to a determination that modified entries in the LDAP directories matches registration criteria received from one or more clients, the proxy notifies the appropriate clients of the modified entries.

26 Claims, 3 Drawing Sheets

METHOD AND SYSTEM FOR SCALABLE EVENT NOTIFICATION IN LIGHTWEIGHT DIRECTORY ACCESS PROTOCOL SYSTEMS

TECHNICAL FIELD OF THE INVENTION

This invention relates generally to directory services in a distributed computing environment and, more particularly, to scalable event notification in lightweight directory access protocol (LDAP) systems.

BACKGROUND OF THE INVENTION

A directory service is the central point where network services, security services and applications can inform other entities in the network about their services, thus forming an integrated distributed computing environment. The Lightweight Directory Access Protocol (LDAP) has emerged as an Internet Engineering Task Force (IETF) open standard to provide directory services to applications including e-mail systems and distributed system management tools. LDAP is a sibling protocol to the hypertext transfer protocol (HTTP) and the file transfer protocol (FTP) and uses the ldap:// prefix in its uniform resource locator (URL). LDAP is an evolving protocol that is based on a client-server model in which a client makes a transmission control protocol/Internet protocol (TCP/IP) connection to an LDAP server, sends requests and receives responses.

The LDAP information model, in particular, is based on an entry that contains information about some object. Entries are often created in a directory to hold information about some object or concept in the real world, such as, for example, a person, an organization or a printer. Entries are composed of attributes that contain information to be recorded about an object. Entries are usually arranged in a tree structure that follows a geographical and organizational distribution. Entries are named according to their position in this hierarchy by a distinguished name (DN).

LDAP provides the capability for directory information to be queried and modified. It offers searching capabilities that permit users to put together complex queries to get desired information. Many LDAP clients want to know when particular data in the database of an LDAP server has been modified. One way to do this is commonly referred to as a persistent search, by which an LDAP client can submit specific search criteria in the form of a search filter. A persistent search is an ongoing search that provides a mechanism by which an LDAP client can receive notification of modifications that occur in an LDAP database. A persistent search does not end after an initial set of entries matching the search criteria of the persistent search of the client have been returned. Rather, the LDAP server continues the persistent search via an active channel through which entries that are modified, as well as additional information about the modifications that occur, can be communicated. A persistent search continues until the client abandons the persistent search. After an initial persistent search is performed, the LDAP server keeps track of the search criteria and sends back information when any entry that matches the search criteria is modified.

Each client that performs a persistent search must maintain an open TCP/IP connection to the LDAP server. This connection can negatively impact on the performance of the LDAP server. For this reason, LDAP client implementors have been encouraged to avoid use of persistent searches for non-essential tasks and to close idle TCP/IP connections as soon as possible. Moreover, LDAP server implementors have been encouraged to support a large number of client connections if large numbers of persistent-search clients are anticipated. However, it is sometimes impractical or undesirable to follow these suggestions.

As the number of persistent-search clients increases, performance of the LDAP server can suffer to a greater extent and the time required for clients to receive responses to their persistent-search requests can increase significantly. Of course, the number of modifications that are made to the directory of the LDAP server also impacts performance of the LDAP server. One of the reasons LDAP persistent search does not scale well as the number of active persistent-search clients increases is because search criteria submitted by each persistent-search client must be compared by the LDAP server every time an entry is updated.

Thus, there is a need to provide a more efficient, less resource-intensive, and faster system and method to perform directory searches of LDAP servers.

SUMMARY OF THE INVENTION

The present invention is directed to a method and system that satisfy the need for more efficient, less resource-intensive, and faster directory searches of LDAP servers. In accordance with the method, a portion of a directory of a server is searched using a proxy. The proxy is notified of modifications made to entries in the portion of the directory. A determination is then made by the proxy as to whether a modified entry matches certain registration criteria specified by at least one client. If so, the proxy notifies the at least one client of the modified entry. The proxy can combine registration criteria received from a plurality of clients into a single search of the portion of the directory. The clients can perform registrations restricted to the portion of the directory.

A directory-search system having features of the present invention comprises a server including a directory that has a plurality of entries. Each entry is represented by a unique identifier. The directory-search system responds to a submitted search of a portion of the directory by issuing notice of modified entries in that portion of the directory found by the search. A proxy of the directory-search system is interoperably connected to the server. The proxy submits a search of the portion of the directory and, responsive to a match between a modified entry and a registration by at least one client, notifies the at least one client of the modified entry. The search submitted by the proxy can comprise a combination of registrations by a plurality of clients into a single search of the portion of the directory. Registrations of the clients can be restricted to the portion of the directory.

BRIEF DESCRIPTION OF THE DRAWINGS

A more complete understanding of the method and system of the present invention may be acquired by reference to the following Detailed Description when taken in conjunction with the accompanying Drawings wherein.

DESCRIPTION OF THE PREFERRED EMBODIMENTS

Figure 1:
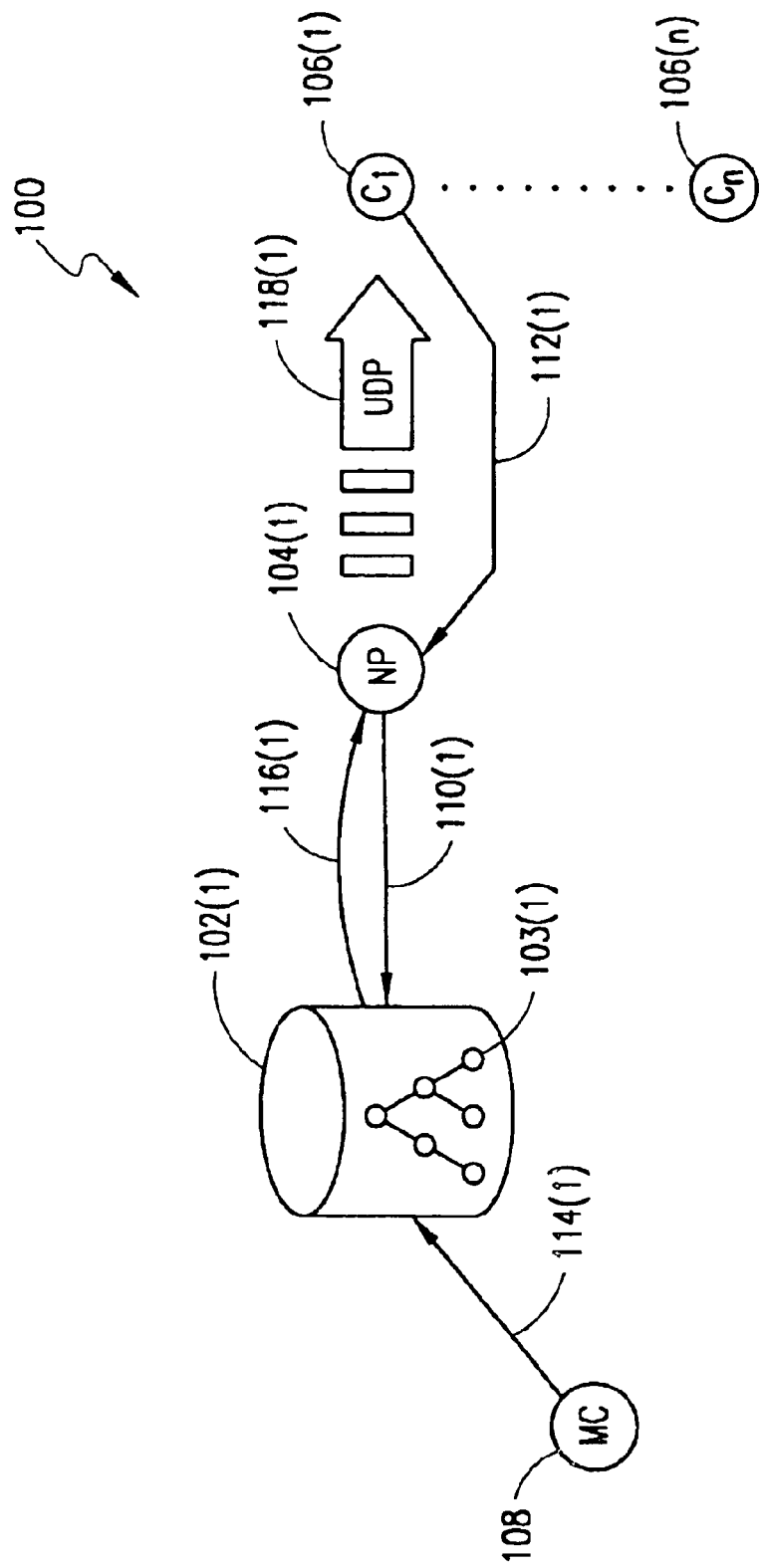
FIG. 1 is a block diagram illustrating a directory-search system in accordance with a first embodiment of the present invention.

Reference is now made to FIG. 1, wherein there is shown a block diagram illustrating a directory-search system 100 in accordance with a first embodiment of the present invention. The system 100 has a lightweight directory access protocol (LDAP) server 102(1) having a directory 103(1), a notification proxy (NP) 104(1), clients $C_1$ 106(1)–$C_n$ 106(n) (wherein n is an integer), and a modifying client (MC) 108. The modifying client 108 is not necessarily the only client of the LDAP server 102(1) that can modify entries in the directory 103(1). In a typical construction, one or more of the clients $C_1$ 106(1)–$C_n$ 106(n) can also modify entries in the directory 103(1) and thus may comprise the modifying client 108. The LDAP server 102(1) is interoperably connected to at least the notification proxy 104(1) and the modifying client 108, and may be interoperably connected to one or more of the clients $C_1$ 106(1)–$C_n$ 106(n). The directory 103(1) comprises a plurality of entries, wherein each entry is preferably represented by a unique identifier, such as a distinguished name (DN).

Upon start-up, the notification proxy 104(1) issues an LDAP persistent search 110(1) of a portion of the directory 103(1). The portion of the directory 103(1) can be all of the directory 103(1) or less than all of the directory 103(1), such as, for example, one or more subtrees of the directory 103(1). The persistent-search 110(1) typically consists of a Boolean query representing a superset of persistent-search queries previously presented to the notification proxy 104(1) $C_1$ 106(1)–$C_n$ 106(n). The notification proxy 104(1) can alternatively be configured to issue a persistent search 110(1) of a predetermined portion of the directory 103(1), such as a particular subtree of the directory 103(1).

When the client $C_1$ 106(1) starts up, it performs registration 112(1) of the distinguished name of the entries that interest the client $C_1$ 106(1), which informs the notification proxy 104(1) that the client $C_1$ 106(1) is interested in receiving specified modification notifications. The registration 112(1) informs the notification proxy 104(1) of the entries in which the client $C_1$ 106(1) is interested and can also include other criteria, such as the kinds of modifications in which the client $C_1$ 106(1) is interested. The notification proxy 104(1) typically uses a table to manage registrations of the clients $C_1$ 106(1)–$C_n$ 106(n) and a simple hash table with mapping to uniquely identify each of the clients $C_1$ 106(1)–C, 106(n).

When the modifying client 108 performs a modification 114(1) of an entry in the directory 103(1), if the entry modified by the modifying client 108 matches the persistent search issued by the notification proxy 104(1), the LDAP server 102(1) issues a notification 116(1). The scope of the persistent search 110(1) of the notification proxy 104(1) is typically a superset of the scopes of the registrations of the clients $C_1$ 106(1)–$C_n$ 106(n). The notification 116(1) informs the notification proxy 104(1) of the modified entry and can include the modified entry itself.

In response to the notification 116(1) by the LDAP server 102(1), the notification proxy 104(1) determines whether the distinguished name of the modified entry matches the registration of the client $C_1$ 106(1). If so, the notification proxy 104(1) sends a universal data protocol (UDP) datagram. 118(1) to the client $C_1$ 106(1). The datagram 118(1) notifies the client $C_1$ 106(1) of the modified entry in the portion of the directory 103(1). The datagram 118(1) can also include the modified entry itself as well as its attributes and/or other information about the modified entry in the portion of the directory 103(1) in which the client $C_1$ 106(1) is interested.

Although only one registration 112(1) is shown, a plurality of registrations will most typically be performed by one or more of the clients $C_1$ 106(1)–$C_n$ 106(n) and the modifying client 108 and combined by the notification proxy 104(1) into a single persistent search of the portion of the directory 103(1). In addition, although only one UDP datagram 118(1) is shown, a plurality of UDP datagrams will most typically be issued to one or more of the clients $C_1$ 106(1)–$C_n$ 106(n) and modifying client 108. Moreover, although the modifying client 108 is not shown as having access to the notification proxy 104(1), a system could be devised in which the modifying client 108 is interoperably connected to the notification proxy 104(1) and can perform registrations with the notification proxy 104(1).

It can thus be seen from FIG. 1 that the notification proxy 104(1) can issue a single persistent search 110(1) on behalf of one or more of the clients $C_1$ 106(1)–$C_n$ 106(n). The notification proxy 104(1) combines the registrations of the clients $C_1$ 106(1)–$C_n$ 106(n) into a single persistent-search query or, alternatively, performs a search of a predetermined portion of the directory 103(1). When the modifying client 108 performs a modification 114(1) of an entry in the portion of the directory 103(1), the LDAP server 102(1) responds to the persistent search 110(1) of the notification proxy 104(1) by sending a notification 116(1) to the notification proxy 104(1). The notification proxy 104(1) then determines whether the modified entry in the portion of the directory 103(1) is of interest to any of the clients $C_1$ 106(1)–$C_n$ 106(n) and sends a UDP datagram 118(1), if applicable, to the appropriate client(s) of the clients $C_1$ 106(1)–$C_n$ 106(n). Therefore, the load on the LDAP server 102(1) from persistent searches is reduced from n connections to a single connection and from n potential search filters to a single search filter.

Figure 2:
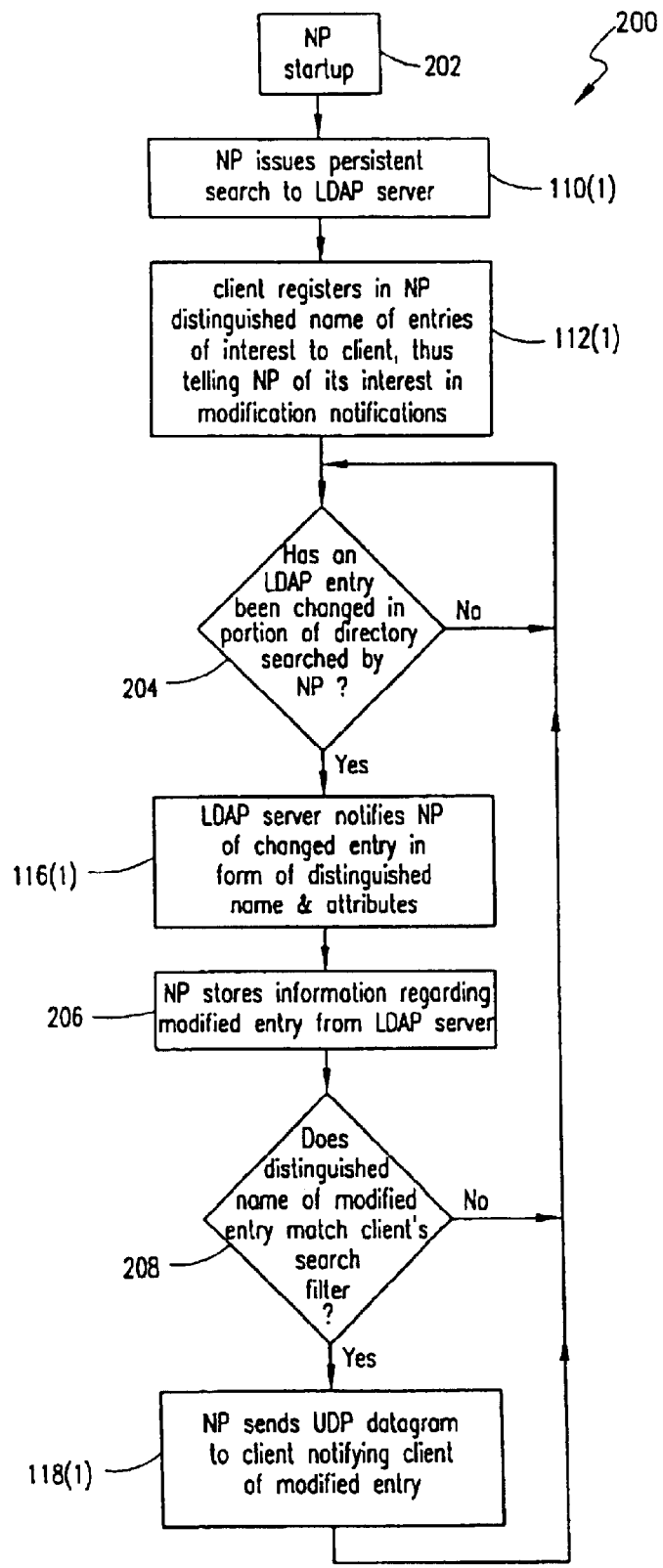
FIG. 2 is a flow chart illustrating operation of the directory-search system in accordance with the present invention.

Reference is now made to FIG. 2 wherein there is shown a flow chart illustrating operation of the system 100 in accordance with the present invention. A process 200 begins at step 202, wherein the notification proxy (NP) 104(1) starts up. From step 202, execution proceeds to step 110(1), wherein the notification proxy 104(1) issues a persistent search of the directory 103(1) of the LDAP server 102(i). Next, the client $C_1$ 106(1) performs the registration 112(1) of the distinguished name of the entries that interest the client $C_1$ 106(1) in the notification proxy 104(1), thus telling the notification proxy 104(1) of the interest of the client $C_1$ 106(1) in notification of modifications of specified entries in the portion of the directory 103(1). The registration 112(1) informs the notification proxy 104(1) of the entries in which the client $C_1$ 106(1) is interested and can also include other criteria, such as the kinds of modifications in which the client $C_1$ 106(1) is interested.

Next, at step 204, a determination is made whether an entry has been modified in the portion of the directory 103(1) subject to the persistent search of the notification proxy 104(1). If it is determined at step 204 that an entry has been so modified, execution proceeds to step 116(1). At step 116(1), the LDAP server 102(1) issues a notification to the notification proxy 104(1). The notification informs the notification proxy 104(1) of the modified entry and can include the modified entry itself. The notification 116(1) of the notification proxy 104(1) by the LDAP server 102(1) most typically comprises the distinguished name and attributes of the modified entry.

Next, execution proceeds to step 206, wherein the notification proxy 104(1) stores the information regarding the modified entry received from the LDAP server 102(1) in the notification 116(1). Next, execution proceeds to step 208, wherein a determination is made whether the distinguished name of the modified entry matches the registration of the client $C_1$ 106(1). If it is determined at step 208 that the distinguished name of the modified entry matches the registration of the client $C_1$ 106(1), execution proceeds to step 118(1). At step 118(1), the notification proxy 104(1) sends a universal data protocol (UDP) datagram to the client $C_1$ 106(1), which notifies the client $C_1$ 106(1) of the modified entry in the portion of the directory 103(1).

If, at step 204, it is determined that there has not been an LDAP entry modified in the portion of the directory, execution returns to step 204. If, at step 208, it is determined that the distinguished name of the modified entry does not match the registration of the client $C_1$ 106(1), execution returns to step 204. From step 118(1), execution returns to step 204.

It can thus be seen from FIG. 2 that the notification proxy 104(1) allows a plurality of persistent-search queries previously performed by clients to be offloaded from the LDAP server 102(1) to the notification proxy 104(1) so that a single persistent-search query can be issued on behalf of the clients $C_1$ 106(1)–$C_n$ 106(n). This offloading reduces the load on the LDAP server 102(1) and permits the LDAP server to more quickly and efficiently perform updates.

Figure 3:
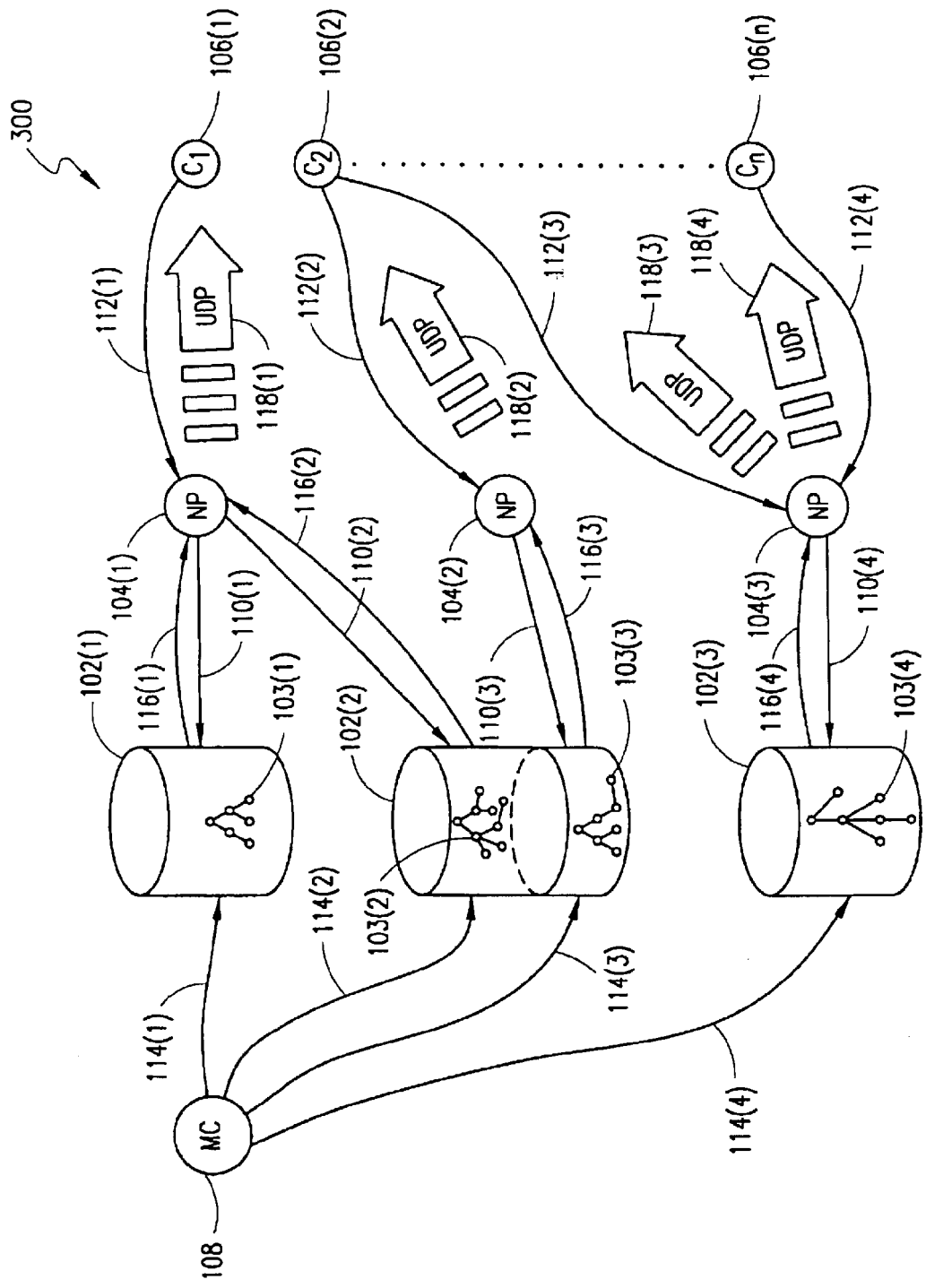
FIG. 3 is a block diagram illustrating a plurality of LDAP servers served by a plurality of notification proxies in accordance with a second embodiment of the present invention.

Reference is now made to FIG. 3, wherein is shown a block diagram illustrating a plurality of LDAP servers served by a plurality of notification proxies in accordance with a second embodiment of the present invention. A system 300 includes the LDAP server 102(1) and LDAP servers 102(2) and 102(3), the notification proxy 104(1) and notification proxies 104(2) and 104(3), the clients $C_1$ 106(1)–$C_n$ 106(n), and the modifying client 108.

The LDAP server 102(1) includes the directory 103(1). The LDAP server 102(2) includes a directory 103(2) and a directory 103(3). The LDAP server 102(3) includes a directory 103(4). The LDAP server 102(1) is served by the notification proxy 104(1). The LDAP server 102(2) is served by the notification proxies 104(1) and 104(2), the notification proxy 104(1) serving the directory 103(2) and the notification proxy 104(2) serving the directory 103(3). The LDAP server 102(3) is served by the notification proxy 104(3). The clients $C_1$ 106(1)–$C_n$ 106(n) and the modifying client 108 are clients of each of the LDAP servers 102(1), 102(2), and 102(3). The modifying client 108 is capable of modifying entries in any of the directories 103(1), 103(2), 103(3), or 103(4).

Exemplary operation of the system 300 will now be described. Operation of the notification proxy 104(1) will be described first. At start-up, the notification proxy 104(1) issues a persistent search 110(1) of the LDAP server 102(1) and issues a persistent search 110(2) of the LDAP server 102(2). The persistent search 110(1) is of the directory 103(1) of the LDAP server 102(1) and the persistent search 110(2) is of the directory 103(2) of the LDAP server 102(2). Next, upon startup, the client $C_1$ 106(1) performs the registration 112(1) in the notification proxy 104(1) of the distinguished name of the entries that interest the client $C_1$ 106(1), thus telling the notification proxy 104(1) of the interest of the client $C_1$ 106(1) in specific modification notifications. The registration 112(1) informs the notification proxy 104(1) of the entries in which the client $C_1$ 106(1) is interested and can also include other criteria, such as the kinds of modifications in which the client $C_1$ 106(1) is interested.

When the modifying client 108 performs the entry modification 114(1) of the directory 103(1) of the LDAP server 102(1), if the modified entry in the directory 103(1) matches the search filter of the persistent search 110(1) issued by the notification proxy 104(1), the LDAP server 102(1) issues the notification 116(1) to the notification proxy 104(1) in the form of the distinguished name and attributes of the modified entry in the directory 103(1). When the modifying client 108 performs an entry modification 114(2) on the directory 103(2) of the LDAP server 102(2), if the modified entry in the directory 103(2) of the LDAP server 102(2) matches a search filter of the persistent search 110(2) performed by the notification proxy 104(1), the LDAP server 102(2) issues a notification 116(2) to the notification proxy 104(1) in the form of the distinguished name and attributes of the modified entry in the directory 103(2).

If the notification proxy 104(1) determines that the distinguished name of the modified entry in the directory 103(1) matches the distinguished name of an entry that interests the client $C_1$ 106(1) as defined by the registration 112(1) of the client $C_1$ 106(1), the notification proxy 104(1) sends the universal data protocol (UDP) datagram 118(1) to the client $C_1$ 106(1), which datagram 118(1) notifies the client $C_1$ 106(1) of the modified entry in the directory 103(1). If the notification proxy 104(1) determines that the distinguished name of the modified entry in the directory 103(2) matches the distinguished name of an entry that interests the client $C_1$ 106(1) as defined by the registration 112(1), the notification proxy 104(1) can include in the UDP datagram 118(1) information that notifies the client $C_1$ 106(1) of the modified entry in the directory 103(2) as well. In the alternative, the notification proxy 104(1) can send in a UDP datagram 118(0) information that notifies the client $C_1$ 106(1) of the modified entry in the directory 103(2). For example, if the UDP datagram 118(1) only notifies the client $C_1$ 106(1) of the modified entry in the directory 103(1) and has already been sent before the notification proxy 104(1) is notified of the modified entry in the directory 103(2), and the modified entry in the directory 103(2) is of interest to the client $C_1$ 106(1), the notification proxy 104(1) can send the UDP datagram 118(0), which notifies the client $C_1$ 106(1) of the modified entry in the directory 103(2).

Exemplary operation of the notification proxy 104(2) will now be described. Upon start-up, the notification proxy 104(2) issues a persistent search 110(3) of the directory 103(3) of the LDAP server 102(2). Upon start-up, the client $C_2$ 106(2) performs a registration 112(2) of the distinguished name of the entries that interest the client $C_2$ 106(2) in the notification proxy 104(2), thus notifying the notification proxy 104(2) of the interest of the client $C_2$ 106(2) in specified modification notifications on the directory 103(3) of the LDAP server 102(2). The registration 112(2) informs the notification proxy 104(2) of the entries in which the client $C_2$ 106(2) is interested and can also include other criteria, such as the kinds of modifications in which the client $C_2$ 106(2) is interested.

When the modifying client 108 performs an entry modification 114(3) on the directory 103(3) of the LDAP server 102(2), if the modified entry in the directory 103(3) matches a search filter of the persistent search 110(3), the LDAP server 102(2) issues a notification 116(3) to the notification proxy 104(2) in the form of a distinguished name and attributes of the modified entry in the directory 103(3). If the notification proxy 104(2) determines that the distinguished name of the modified entry in the directory 103(3) matches the distinguished name of an entry that interests the client $C_2$ 106(2) as defined by the registration 112(2), the notification proxy 104(2) sends a UDP datagram 118(2) to the client $C_2$ 106(2), thereby notifying the client $C_2$ 106(2) of the modified entry in the directory 103(3).

Operation of the notification proxy 104(3) will now be described. Upon start-up, the notification proxy 104(3) issues a persistent search 110(4) of the directory 103(4) of the LDAP server 102(3). At start-up, the client $C_2$ 106(2) and the client $C_n$ 106(n) perform registrations 112(3) and 112(4), respectively, each of the registrations 112(3) and 112(4) including a distinguished name of the entries that interest the respective client $C_2$ 106(2) or $C_n$ 106(n). The registrations 112(3) and 112(4) tell the notification proxy 104(3) of the interest of the clients $C_2$ 106(2) and $C_n$ 106(n) in modification notifications on the directory 103(4). The registrations 112(3) and 112(4) each inform the notification proxy 104(1) of the entries in which the client $C_2$ 106(2) and $C_1$ 106(n), respectively, are interested and can also include other criteria, such as the kinds of modifications in which the client $C_2$ 106(2) and $C_n$ 106(n), respectively, are interested.

When the modifying client 108 performs an entry modification 114(4) on the directory 103(4) of the LDAP server 102(3), if the modified entry in the directory 103(4) matches a search filter of the persistent search 110(4) of the notification proxy 104(3), the LDAP server 102(3) issues a notification 116(4) of the notification proxy 104(3) in the form of a distinguished name and attributes of the modified entry in the directory 103(4). If the notification proxy 104(3) determines that the modified entry in the directory 103(4) matches the distinguished name of an entry that interests both the client $C_2$ 106(2) and the client $C_n$ 106(n), the notification proxy sends a UDP datagram 118(3) to the client $C_2$ 106(2) and a UDP datagram 118(4) to the client $C_n$ 106(n), respectively. The UDP datagrams 118(3) and 118(4) notify the clients $C_2$ 106(2) and $C_n$ 106(n), respectively, of the modified entry in the directory 103(4). Of course, if the distinguished name of the modified entry in the directory 103(4) matches an entry that interests only one of the clients $C_2$ 106(2) or $C_n$ 106(n), only the appropriate UDP datagram 118(3) or 118(4) will be sent. If the modified entry in the directory 103(4) does not match an entry of interest to either the client $C_2$ 106(2) or the client $C_n$ 106(n), no UDP datagram will be sent by the notification proxy 104(3) to the client $C_2$ 106(2) or the client $C_n$ 106(n).

It can thus be seen from FIG. 3 that numerous variations of multiple LDAP servers, multiple notification proxies, and multiple clients can be devised in accordance with the teachings of the present invention. For example, a notification proxy can serve multiple clients, a client can be served by multiple notification proxies, and an LDAP server can be accessed by multiple notification proxies. In addition, although not shown in FIG. 3, it will be understood by those skilled in the art that more than one modifying client can be given privileges to modify entries in a given LDAP server.

It is apparent from FIG. 3 and the description thereof that use of one or more notification proxies reduces the load on the LDAP servers and allows each notification proxy to perform a single persistent search of one or more LDAP servers. The notification proxies can then respond to multiple registrations by clients.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method of searching a directory of a server comprising the steps of:
   searching a portion of the directory using a proxy;
   notifying the proxy of a modification made to an entry in the searched portion of the directory;
   determining by the proxy whether the modified entry matches certain registration criteria specified by at least one client; and
   in response to a match, notifying by the proxy of the client concerning the modified entry.

2. The method of claim 1 wherein the step of searching comprises the step of combining by the proxy of registration criteria received from a plurality of clients into a single search of the portion of the directory.

3. The method of claim 1 wherein the registration criteria of the at least one client are restricted to the portion of the directory.

4. The method of claim 1 wherein the step of searching the portion of the directory comprises the step of performing a persistent search.

5. The method of claim 1 wherein the directory operates according to lightweight-directory-access protocol (LDAP).

6. The method of claim 1 further comprising the step of registering by the at least one client with the proxy of a distinguished name of at least one entry that interests the client, the certain registration criteria including the distinguished name of the at least one entry.

7. The method of claim 6 wherein the step of registering further comprises the step of the at least one client registering with the proxy via a transmission-control protocol/Internet protocol (TCP/IP) connection and specifying the distinguished name of the at least one entry that interests the at least one client to the proxy.

8. The method of claim 1 wherein the portion of the directory is a sub-tree of the directory.

9. The method of claim 1 wherein the step of notifying the at least one client further comprises the step of sending by the proxy of a universal-data-protocol (UDP) datagram to the at least one client.

10. The method of claim 9 wherein the step of notifying the at least one client further comprises the step of correlating by the proxy of a distinguished name of the modified entry with a distinguished name of the at least one client.

11. The method of claim 1 wherein the step of notifying the at least one client comprises the step of notifying the at least one client that an entry matching the certain registration criteria has been modified.

12. The method of claim 1 wherein the step of notifying comprises the step of notifying the at least one client that an entry has been modified and identifying at least one attribute of the modified entry.

13. The method of claim 1 further comprising the step of, in response to the step of searching, returning by the server of all modified entries in the portion to the proxy.

14. The method of claim 13 wherein each returned modified entry comprises a distinguished name and at least one attribute of the entry.

15. A directory-search system comprising:
   a server including a directory having a plurality of entries, each entry represented by a unique identifier, the server operating to respond to a submitted search of a portion of the directory by issuing notice of instances in which entries in that portion are modified; and
   a proxy interoperably connected to the server, wherein the proxy submits the search of the portion of the directory and responds to a match between a modified entry identified in the portion of the directory and a registration by at least one client by notifying the at least one client of the modified entry.

16. The system of claim 15 wherein the search submitted by the proxy comprises a combination of registrations from a plurality of clients into a single submitted search of the portion of the directory.

17. The system of claim 15 wherein the registration of the at least one client is restricted to the portion of the directory.

18. The directory-search system of claim 15 wherein the search issued by the proxy comprises a persistent search of the portion of the directory.

19. The directory-search system of claim 15 wherein the directory operates according to the lightweight-directory-access protocol (LDAP).

20. The directory-search system of claim 15 wherein the portion of the directory is a sub-tree of the directory.

21. The directory-search system of claim 15 wherein the notification by the proxy to the at least one client comprises a universal-data-protocol (UDP) datagram.

22. The directory-search system of claim 21 wherein the proxy correlates a distinguished name of the modified entry with registration criteria of the at least one client.

23. The directory-search system of claim 15 wherein the notification by the proxy comprises notice that a certain entry has been modified.

24. The directory-search system of claim 15 wherein the notification by the proxy comprises notice that a certain entry has been modified and includes at least one attribute of the modified entry.

25. The directory-search system of claim 15 wherein, in response to the search of the portion of the directory submitted by the proxy, the server issues notice of all modified entries in the portion to the proxy.

26. The directory-search system of claim 25 wherein each modified entry comprises a distinguished name and at least one attribute of the entry.

* * * * *